(12) United States Patent
Krug et al.

(10) Patent No.: US 7,970,244 B2
(45) Date of Patent: Jun. 28, 2011

(54) FABRICATION OF AN OPTICAL RING RESONATOR DEVICE

(75) Inventors: William P. Krug, Bellevue, WA (US); Jocelyn Y. Takayesu, Tacoma, WA (US); Michael Hochberg, Pasadena, CA (US); Dennis G. Koshinz, Bellevue, WA (US); Jean A. Nielsen, Kent, WA (US)

(73) Assignee: The Boeing Company, Chicago, IL (US)

( * ) Notice: Subject to any disclaimer, the term of this patent is extended or adjusted under 35 U.S.C. 154(b) by 917 days.

(21) Appl. No.: 11/849,985

(22) Filed: Sep. 4, 2007

(65) Prior Publication Data

US 2010/0015741 A1  Jan. 21, 2010

Related U.S. Application Data

(60) Provisional application No. 60/843,882, filed on Sep. 11, 2006.

(51) Int. Cl.
*G02B 6/26* (2006.01)
*G02B 6/42* (2006.01)
*H01L 21/00* (2006.01)

(52) U.S. Cl. ............... 385/32; 438/31; 438/32; 385/40; 385/50

(58) Field of Classification Search ............... 438/29–32; 359/245–254; 385/32, 40, 50, 129–132
See application file for complete search history.

(56) References Cited

U.S. PATENT DOCUMENTS

| | | | |
|---|---|---|---|
| 5,581,642 A * | 12/1996 | Deacon et al. ................. | 385/15 |
| 5,926,496 A | 7/1999 | Ho et al. | |
| 6,195,187 B1 | 2/2001 | Soref et al. | |
| 6,865,314 B1 * | 3/2005 | Blair et al. ..................... | 385/27 |
| 7,502,405 B2 * | 3/2009 | Tan et al. ....................... | 372/94 |
| 2002/0012885 A1 * | 1/2002 | Steinberg et al. ............. | 430/321 |
| 2002/0110302 A1 * | 8/2002 | Gopalakrishnan ............. | 385/2 |
| 2004/0029053 A9 * | 2/2004 | Steinberg ....................... | 430/321 |
| 2004/0114930 A1 | 6/2004 | Krug et al. | |
| 2004/0201026 A1 * | 10/2004 | Gill et al. ....................... | 257/79 |
| 2005/0053319 A1 * | 3/2005 | Doan ............................. | 385/14 |
| 2005/0054199 A1 * | 3/2005 | Block et al. ................... | 438/689 |

FOREIGN PATENT DOCUMENTS

| | | |
|---|---|---|
| WO | WO 00/49752 | 8/2000 |
| WO | WO 01/22141 A1 | 3/2001 |
| WO | WO 02/11489 A2 | 2/2002 |
| WO | WO 03/007440 | 1/2003 |

OTHER PUBLICATIONS

Michael Hochberg et al., Towards a Millivolt Optical Modulator With Nano-Slot Waveguides, Optics Express, vol. 15, No. 13, Jun. 25, 2007, pp. 8401-8410.

Tom Baehr-Jones et al., Optical Modulation and Detection in Slotted Silicon Waveguides, Optics Express, vol. 13, No. 14, Jul. 11, 2005, pp. 5216-5226.

(Continued)

*Primary Examiner* — Michael S Lebentritt
*Assistant Examiner* — Karen M Kusumakar

(57) ABSTRACT

An embodiment of a method for manufacturing an optical ring resonator device is disclosed. The method forms a ring resonator waveguide on a semiconductor substrate, forms an unoriented electro-optic polymer cladding over the ring resonator waveguide, and forms electrodes on the semiconductor substrate. The unoriented electro-optic polymer cladding is configured to change orientation under an applied electric field, and the electrodes are coupled to the optical ring resonator for manipulation of the electric field applied to the oriented electro-optic polymer cladding for rapid voltage tuning of its index.

23 Claims, 11 Drawing Sheets

OTHER PUBLICATIONS

Tom Baehr-Jones et al., Optical Resonators in Silicon-On-Insulator-Based Slot Waveguides, Applied Physics Letters 86, 2005.

Gates et al., Hybrid Integrated Silicon Optical Bench Planar Lightguide Circuits, 1998 Electronic Components and Technology Conference, May 25, 1998, pp. 551-559, New York, NY.

Boussey, et al., Optoelectronic Integration in Silicon-On-Insulator Technologies, Semiconductor Conference 1998, Oct. 6, 1998, pp. 407-415, New York, NY.

Baack, Entwicklungstendenzen Photonischer Nachrichtennetze, Trends of Photonic Communications Network, Sep. 1, 1996, pp. 192-197, vol. 50, No. 9/10, Berlin, DE.

Kosaka, et al., Superprism Phenomena in Photonic Crystals, American Institute of Physics, Oct. 15, 1998, pp. R10096-R10099, vol. 58, No. 16, Japan.

MICROMAGAZINE.COM, Holy Grail! Motorola Claims High-yield GaAs Breakthrough, Oct. 1, 2001, pp. 1-3.

* cited by examiner

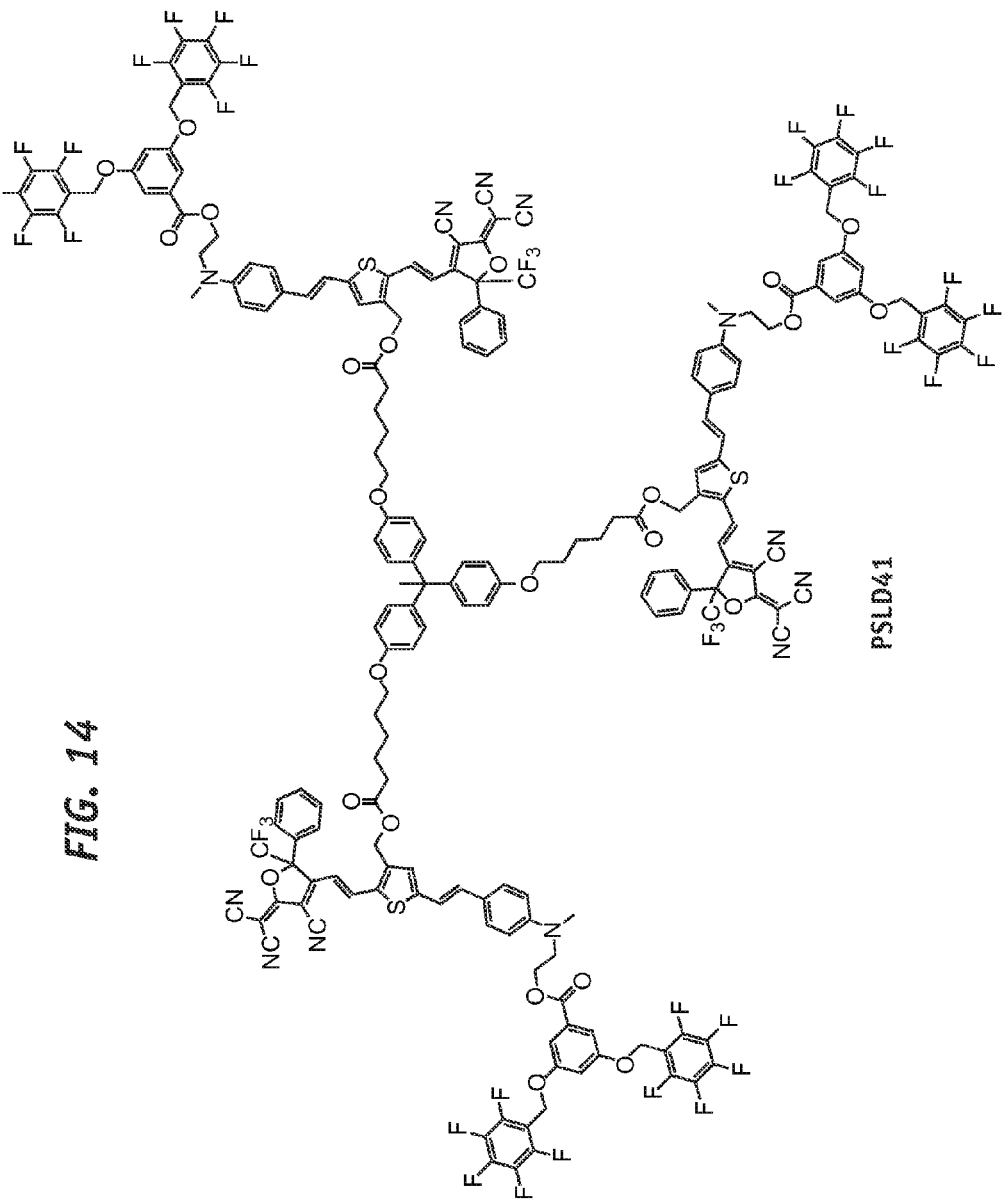
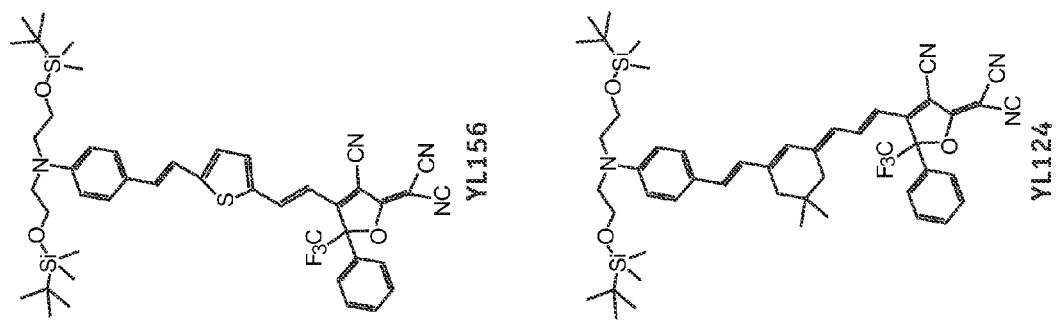
FIG. 14

TABLE 1. PREDICTED AND MEASURED ELECTRO-OPTIC ACTIVITY FOR VARIOUS DEVICES AT 1550 nm

| MATERIAL | INDEX | ELECTRODE SPACING (μm) | POLING FIELD (V/μm) | EXPECTED $r_{33}$ (pm/V) | $r_{33}$ (pm/V) | TUNING (GHz/V) | Q VALUE |
|---|---|---|---|---|---|---|---|
| YL156/PMMA | 1.56 | 4.2 | 71 | 36 | 13 ± 2 | 0.10 | 1890 |
| YL124/APC | 1.61 | 4.5 | 67 | 67 | 22 ± 1 | 0.17 | 3000 |
| YL124/PAS41 | 1.73 | 5.5 | 55 | 157 | 40 ± 2 | 0.34 | 1750 |

TABLE 2. TUNABLE WDM MICRO-RING RESONATOR ROADM AND MODULATOR SUMMARY AT 1550 nm

| | WAVELENGTH ADD/DROP TUNING TIME (usec) | EO TUNING OF CHANNEL TUNING (GHz/V) | $r_{33}$ (pm/V) | FLAT TOP OR CLEAR CHANNEL BW PASSBAND (GHz) | TUNING (GHz) | #Ch@50 GHz Ch SPACING |
|---|---|---|---|---|---|---|
| 1 x 4 x 1 RAPIDLY TUNABLE HYBRID EO POLYMER-Si ROADM | <0.3 | 0.34 | 92 | 1st ORDER FILTER | 180 | 0.34 |
| 1 x 4 x 1 RAPIDLY TUNABLE HYBRID EO POLYMER-Si MODULATOR | MODULATION SPEED (MHz) >3* | FWHM SHIFT (V) 324 | $r_{33}$ (pm/V) 92 | Q 1750 | | |

*TIME FRAME FOR BURST OPTICAL SWITCHING REGIME

FIG. 22

FABRICATION OF AN OPTICAL RING RESONATOR DEVICE

CROSS-REFERENCE TO RELATED APPLICATION

This application claims the benefit of U.S. Provisional Application No. 60/843,882, filed Sep. 11, 2006, the content of which is incorporated herein by reference.

STATEMENT REGARDING FEDERALLY SPONSORED RESEARCH OR DEVELOPMENT

This invention was made with government support under contract number N00421-02-D-3223 D.O. 0001 awarded by DARPA and contracted by the United States Navy. The government has certain rights in this invention.

TECHNICAL FIELD

Embodiments of the present disclosure relate generally to semiconductor devices and related manufacturing processes. More particularly, embodiments of the present disclosure relate to a fabrication process for semiconductor-based reconfigurable optical ring resonators.

BACKGROUND

In fiber optic communications, dense wavelength division multiplexing (DWDM) is a technique for multiplexing multiple optical carrier signals onto a single optical fiber. This form of frequency division multiplexing is commonly referred to as DWDM when applied to optical systems that employ a high level of multiplexing. The potential of optical fibers is more fully exploited when multiple beams of light at different frequencies (wavelengths) are transmitted on the same fiber. By using different wavelengths of laser light to carry different signals, capacity is multiplied. In a DWDM system, a multiplexer is used at the transmitter to join the signals together and a de-multiplexer is used at the receiver to split the signals apart.

An optical ring resonator is a device that is capable of both multiplexing and de-multiplexing, and it can function as an add-drop multiplexer on a fiber-optic communication bus. Optical ring resonators include a waveguide in a closed loop, coupled to one or more input/output (or bus) waveguides. When light of the appropriate wavelength is coupled from an input waveguide to the ring, constructive interference causes a buildup in intensity over multiple round-trips through the ring. The light is ultimately coupled to an output waveguide. Since only selected wavelengths resonate in the ring, the ring functions as a filter. A range of applications such as optical switching, electro-optical switching, wavelength conversion, and filtering have been demonstrated using optical ring resonators.

An optical ring resonator waveguide is a transmission line that transmits light via refractions of light off the boundary layer between the walls of the optical waveguide and cladding covering the walls of the optical waveguide. The angle of refraction is wavelength dependent, so some wavelengths will propagate through the waveguide, and other wavelengths will be attenuated, allowing control over which wavelengths can travel in the optical waveguide. Furthermore, only wavelengths that divide evenly into the path length of the ring resonator are trapped, or filtered, from the waveguide into the ring.

The waveguides may be simple ridges or a composition of multiple parallel ridges as observed in slotted waveguides. A ridge waveguide is a convex silicon waveguide formed on an insulative silicon oxide substrate. A slotted waveguide is a concave waveguide formed as a slotted air-gap structure between two high refraction index waveguides. The optical characteristics of the ridge-waveguide ring resonators or slotted-waveguide ring resonators may be effectively changed to control the transmissible wavelengths by adding a cladding layer to the ridges or slots whose refractive index changes with applied electrical or intense optical fields.

Existing technologies for optical ring resonators: (1) switch too slowly (e.g., no faster than the microsecond, and typically millisecond range); (2) only switch over a very limited wavelength range, namely, a single full width at half maximum (FWHM); (3) are not readily compatible with silicon processing; (4) do not readily scale due to their large size which limits the number of ring resonators that can fit on a single silicon chip (owing their large size to their traditional fabrication process/materials); (5) are limited to configurable DWDM circuits; (6) do not readily extend over a 20 nanometer free spectral range required for wavelength switching across the C-band; and (7) do not operate at practical voltages since electro-optic coefficients are insufficient.

BRIEF SUMMARY

Methods are disclosed for a process for the fabrication of an electro-optic active hybrid organic-silicon ridge waveguide ring resonator device. At least one of the methods uses a silicon-on-insulator silicon ridge waveguide ring resonators coated with randomly oriented electro-optic chromophores in a polymer host. Alignment of the electro-optic material using an electric field creates a polarized or noncentrosymmetric material that allows for rapid tuning of wavelength resonances, yielding rapid wavelength tuning and selectivity.

A first embodiment relates to a method for manufacturing an optical ring resonator device. The method involves: forming a ring resonator waveguide on a semiconductor substrate; forming an unoriented electro-optic polymer cladding over the ring resonator waveguide, the unoriented electro-optic polymer cladding being configured to change orientation under an applied electric field; and forming electrodes on the semiconductor substrate, the electrodes being coupled to the optical ring resonator for manipulation of the electric field applied to the oriented electro-optic polymer cladding for rapid voltage tuning of its index.

A second embodiment relates to a method for manufacturing an optical ring resonator device. The method involves: forming a ring waveguide on a semiconductor substrate; forming a central electrode element on the semiconductor substrate, the central electrode element being surrounded by the ring waveguide; forming an outer electrode element on the semiconductor substrate, the outer electrode element being located outside a perimeter of the ring waveguide; forming an electro-optic polymer cladding layer over the ring waveguide, over the central electrode element, and over the outer electrode element; and creating a conductive via in the electro-optic polymer cladding layer, the conductive via terminating at the central electrode element.

A third embodiment relates to a method for manufacturing an optical ring resonator device. The method involves: providing a wafer comprising a semiconductor substrate; forming an insulating layer on the semiconductor substrate; forming a ring resonator waveguide over the insulating layer; forming, from a conductive layer, a central electrode element and an outer electrode element, the ring resonator waveguide surrounding the central electrode element, and the outer electrode element being located outside a perimeter of the ring resonator waveguide; covering the ring resonator waveguide, the central electrode element, and the outer electrode element with an unoriented electro-optic polymer layer, the unoriented electro-optic polymer layer being configured to change orientation under an applied electric field; forming a protective layer over the electro-optic polymer layer, wherein the protective layer has dielectric isolation properties; forming a hard mask over the protective layer; forming a via hole in the protective layer and in the electro-optic polymer layer, the via hole being defined by the hard mask, and the via hole terminating at the central electrode element; and depositing electrode material in the via hole, the electrode material establishing electrical contact with the central electrode element.

This summary is provided to introduce a selection of concepts in a simplified form that are further described below in the detailed description. This summary is not intended to identify key features or essential features of the claimed subject matter, nor is it intended to be used as an aid in determining the scope of the claimed subject matter.

BRIEF DESCRIPTION OF THE DRAWINGS

A more complete understanding of embodiments of the present subject matter may be derived by referring to the detailed description and claims when considered in conjunction with the following figures, wherein like reference numbers refer to similar elements throughout the figures.

FIG. 14 illustrates chemical structures of electro-optic chromophores;

FIG. 22 is a table of tunable WDM Micro-Ring Resonator ROADM and Modulator Summary at 1550 nm;

DETAILED DESCRIPTION

Figure 1:
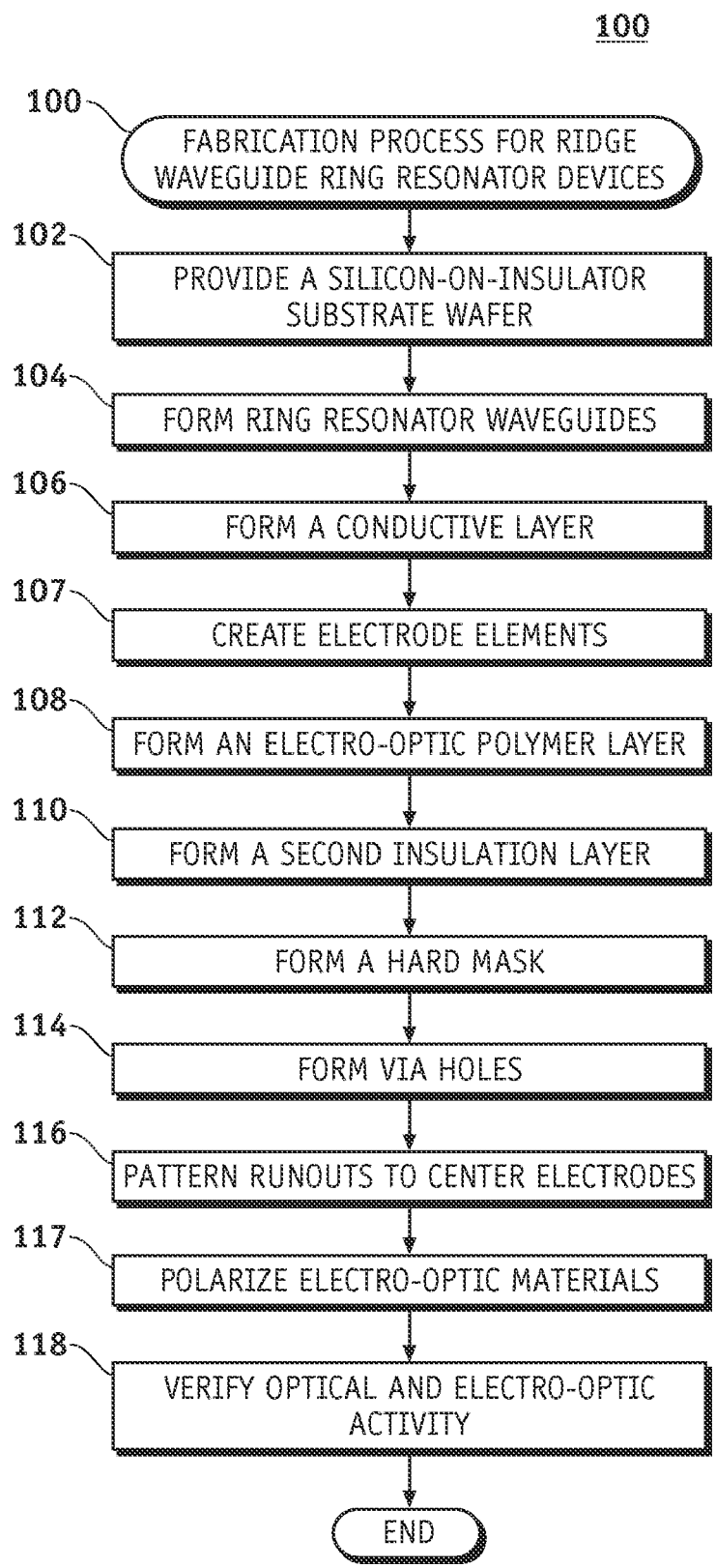
FIG. 1 is a flow chart illustrating a process for manufacturing an electro-optic hybrid organic-silicon ridge waveguide ring resonator.

Electro-optic (EO) building blocks on SOI can enable wafer scale optical interconnects to meet emerging high-speed communications and data processing needs. Organic EO materials for key photonic building blocks have recently shown tenfold greater EO activity than their inorganic counterparts. This trend of increasing EO activity continues through the theory-inspired design and nano-engineering of organic EO materials.

Rapid EO switches such as Mach-Zehnder interferometers and resonant cavity microring resonator filters have many commercial and military applications as building blocks for radiofrequency photonics and wavelength selective switches and modulators for DWDM optical signals. Their voltage tunable wavelength selective filter characteristics are useful for modulators for optical DWDM signals and rapidly wavelength tuned filter devices. These include rapidly tuned ROADMs for configurable DWDM interconnects as well as electro-optic modulators and detectors. ROADMs using MEMs and thermo-optic polymer devices have millisecond response times that limit their use to configurable optical circuits. The very fast (tens of femtoseconds) intrinsic response of organic EO materials make them very attractive for high bandwidth operation. These materials have demonstrated optical modulation speeds up to 100 GHz in commercial devices and up to 1.6 THz experimentally.

Also, the THz intrinsic bandwidth can be traded off for lower drive voltages by use of resonant device structures such as ring resonators, etalons, and photonic bandgap periodic structures. ROADMs using EO materials tune rapidly enough to consider for optical burst and packet switching schemes. Modulators made using inorganic EO materials such as silicon, gallium arsenide, and lithium niobate have recently demonstrated up to 50 GHz modulation speeds. However, due to their intrinsically limited EO activities, slow response times, and high velocity mismatch between electrical and optical waves, these devices have severe performance limitations.

The high EO activity of these organic materials also allows for the fabrication of EO modulators with low halfwave voltages of less than 0.8 V and even lower halfwave voltages have recently been achieved by Lumera Corporation. In addition, the π-electrons of organic materials define both index of refraction and dielectric permittivity behavior leading to good velocity matching between optical and radiofrequency waves organic EO material serves as a velocity-matching medium between radio frequency signals and light making these materials attractive as an ideal medium for electro-optic switches and optical interconnects.

In this study, we have demonstrated some of the advantages of integrating silicon technology with highly active organic EO materials. A hybrid EO ring resonator was designed and the material, fabrication, and operation conditions were optimized to produce an EO active device. From there a multi-device, EO active, rapidly reconfigurable optical add/drop multiplexer (ROADM) with individually tunable microring resonators of good resonance quality and wide channel spacing was designed and built. Mechanical, temporal, and photo-stability of these devices was also studied. In addition to producing very high and controllable EO activities in these devices, we found reasonable correlation between our results and published electro-optic values among a variety of electro-optic materials. Additional details of a typical optical ring resonator can be found in United States Patent Application Number 2004/0114930 A1, the content of which is hereby incorporated by reference in its entirety.

A summary of the operating principles for voltage tuned wavelength selection follows. The change of the effective index for single ring or slotted ring waveguide resonators of circumference or length (l) is $$\Delta n_e = \frac{0.5 K n^3 r_{33} V}{d} V/d,$$

where $\Delta n_e$=change of the effective index;

K=product of effective index susceptibility and effective E-field;

n=refractive index of mode;

$r_{33}$=electro-optic coefficient of cladding or core material;

V=voltage applied across optical waveguide core; and d=electrode gap.

The relative shift in the effective index relative to the effective index of the optical mode in the optical waveguide is $\Delta n_e/n_e = \Delta v_{FWHM}$ (3 dB BW)/v. The typical device tuning voltage parameters are fundamentally limited by the breakdown strength of the material and practically limited by CMOS or suitable drive electronics that will support sub-nanosecond switching times, assuming device response times are minimized by small RC time constants and high Q optical ring geometries that will rapidly turn off. For tunable ring resonator filters, one desires a maximum: (1) wavelength tuning sensitivity (GHz/V) for ring resonator filters where changes in refractive index for electric fields applied to oriented electro-optic materials with maximum $r_{33}$ (pm/V) and minimum electrode gaps; (2) a maximum wavelength tuning range in nm that is limited only by the maximum applied fields and effective index change for the oriented EO polymer cladding with maximum EO material response $r_{33}$ (pm/V).

Device Design and Predictions

Waveguide Geometry

To produce high quality silicon waveguides we use commercially available silicon on insulator wafers with 1.4 μm thick buried oxide layer and 120 nm silicon top layer. The high refractive index contrast between the silicon and oxide layers allows us to fabricate compact waveguides that are 0.5 μm wide while maintaining loss optical losses better than 7 dB/cm. With these dimensions, only one optical mode polarized in the horizontal direction is supported in the 1.4-1.6 μm spectral range. Compared to air, polymer cladding has not shown to significantly change optical loss. Loss may even be slightly decreased due to the mode being pulled into cladding.

Figure 11:
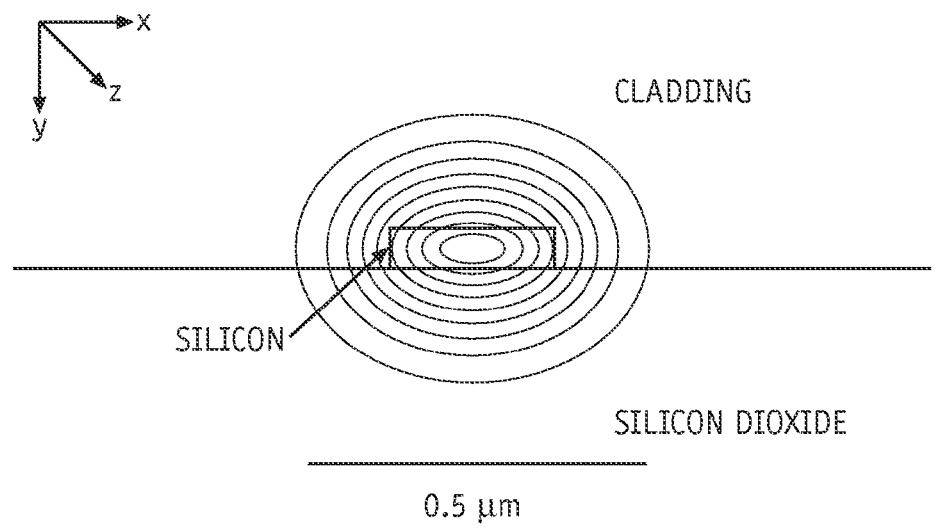
FIG. 11 illustrates modal profile of the silicon waveguide.

Illustrated in FIG. 11 is the modal profile of the silicon waveguide determined using a finite difference-based Hermitian eigensolver. We purposely designed the waveguide to have more than 30% of the mode outside of the core so that perturbing the dielectric constant of the upper cladding would induce a significant change in the effective index of the mode. We can predict the effect of a small regional dielectric change of the upper polymer cladding on the effective index using the equation $$\frac{\partial n_{eff}}{\partial \varepsilon} = \frac{\iint |E|^2 dx dy|}{2\sqrt{\frac{\mu_0}{\varepsilon_0}} \iint R_e(E^* \times H) \cdot e_z dx dy} \quad \text{(Equation 1)}$$

where $\in$ is the electric permittivity, μ is permeability, and E is the applied electric field. Assuming that the mode travels in the z-direction, the numerator is integrated over the upper cladding region and the denominator is integrated over the entire x-y plane.

Ring Resonator Design and Theory

The microring resonator is a resonant cavity device that traps light with wavelengths, $\lambda_m$ that divide evenly into the effective path length, L, of the resonator times the effective index of the mode, $n_{eff}(\lambda_m)$ as shown in equation 2, where m is an integer indicating the order of resonance $$\lambda_m = \frac{L}{m} n_{eff}(\lambda) \quad \text{(Equation 2)}$$

To theoretically predict wavelength shift as a function of cladding index change, we combine equations 1 and 2 in following equation $$\lambda = \frac{L}{m}\left[1 - \left[\frac{L}{m}\right]\left[\frac{\partial_{eff}}{\partial \lambda}\right]\right]^{-1} \times \left[\frac{\partial_{eff}}{\partial \varepsilon_c}\right] \Delta \varepsilon_c + \frac{L}{m} n_{eff}(\lambda_0) \quad \text{(Equation 3)}$$

In previous studies performed by our group using index matching fluids, we found a reasonable correlation between theory predicted values and experimental results.

Resonance wavelengths that satisfy equation 2 can be coupled into and out of ring resonators placed in close proximity to a second waveguide. Coupling efficiency can be lithographically controlled by varying the distance between the waveguide and ring. In these rings a distance of 200 nm was found to be best coupling distance to optimize Q.

We can measure the Q-factor, which is a measure of stored energy in the ring and loss per cycle, by analyzing the optical spectrum of a device using the ratio of wavelength over $\lambda_{FWHM}$, the full bandwidth at half maximum of transmitted power $$Q = \frac{\lambda_0}{\lambda_{FWHM}} \quad \text{(Equation 7)}$$

The free spectral range (FSR) or spacing between resonance peaks can be determined using the equation $$FSR = \lambda_{m+1} - \lambda_m \approx \frac{\lambda^2}{(n_{eff}(\lambda)L)} \quad \text{(Equation 8)}$$

which can also be used to experimentally measure the effective index.

Lastly finesse, f, a factor used to determine channel capacity is the ratio of FSR to $\lambda_{FWHM}$ and is inversely proportional to loss and ring radius.

$$f = \frac{FSR}{\lambda_{FWHM}} \quad \text{(Equation 9)}$$

Silicon, which has an extremely high index of refraction and low optical loss, has allowed for the fabrication of ring resonators with diameters less than 10 μm, FSRs greater than 15 nm, and Q values of over 100,000. In these experiments, however, we intentionally quenched Q to values below 5,000 to allow for greater coupling efficiency and reproducibility.

Diffraction grating coupling was the chosen method for coupling of a single TE mode into and out of the device waveguide. Although diffraction grating coupling introduced an average of −10 dB insertion loss, this coupling method enabled simpler and more reproducible fabrication as well as a reduction of the footprint of the device to less than 250 μm², allowing for dense device packing.

Electrode Design and Theory

The electrodes used to align and modulate the EO active material surrounding the ring resonator waveguide were designed to induce a large electric field parallel to the TE mode. Electrode widths of 5 μm were fabricated due to limited alignment and mask resolution capabilities. Electrode heights of 120 nm were chosen to exclusively modulate cladding within 500 nm of the core, which is an estimated boundary of evanescent wave penetration. To avoid loss due to plasmon coupling of the optical signal to the metal electrodes, the outer electrode was split into two electrodes and connected with long runouts and the inner electrode was accessed using a plated via. Modulation across the coupling regions was avoided in order to simplify the electrode design.

ROADM Design and Theory

Figure 13:
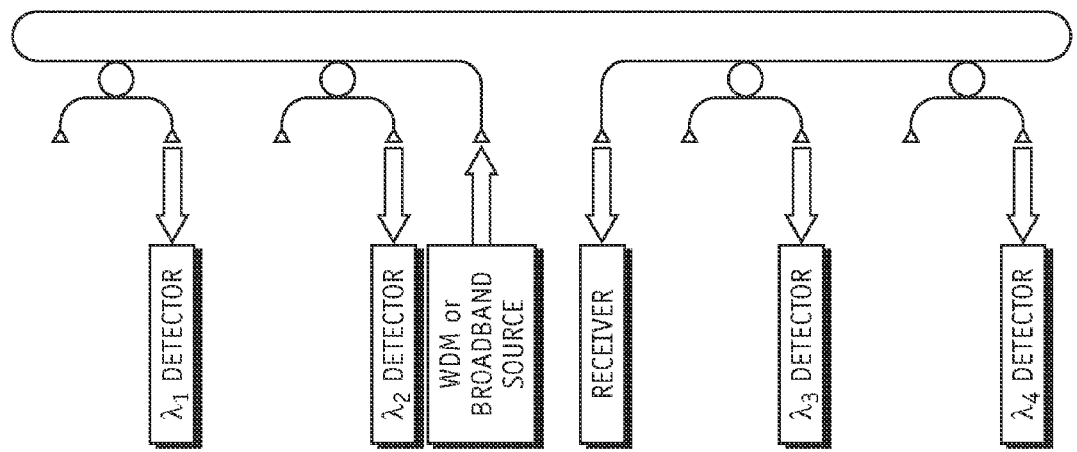
FIG. 13 is a schematic of 1×4×1 Reconfigurable Optical Add-Drop Multiplexer (ROADM) with individually tunable cascaded hybrid electro-optic microring devices coupled to a common bus waveguide.

Of great interest to the data and telecommunications industries is to apply these devices as filters to rapidly and simultaneously add and drop various wavelength channels to and from a single multi-wavelength source coupled to an optical bus in a simple approach to a ROADM device. We demonstrate this concept using a simple cascaded microring device of four microring resonators coupled to a common (bus) waveguide (FIG. 13). Broadband light is inserted into the bus and resonant wavelengths specific to each ring resonator is individually demultiplexed into separate waveguides. Resonance properties can be precisely tuned to select specific wavelengths by varying the radius of each ring or by tuning the cladding index. By reversing the input and output roles, the ROADM in our experiments can also act as a multiplexer to combine various optical signals into a single waveguide.

In ROADM applications, the key figure of merit is to improve the tuning shift (GHZ/V) rather than minimize VFWHM especially for higher pole filters with higher spectral efficiencies. Also of major interest is the speed at which the resonances, or channels, can be tuned.

Electro-optic Materials

When an alternating or constant polarity (i.e., AC or DC) electric field is applied to EO materials, a change in index of refraction occurs which alters the speed of an optical signal traveling through it. The applied electrical field produces this response by disturbing the electronic polarization of non-centrosymmetrically ordered chromophores dispersed in organic matrix material (e.g. polymer or dendrimer). Changes to the applied electric field cause a change in the local refractive index; this is called the Pockels Effect. The relationship of index change, Δn, to applied field can be expressed as:

$$\Delta n = n_0 - n(E) = \frac{1}{2} r_{33} n_0^3 E \quad \text{(Equation 10)}$$

where $n_o$ is the index of refraction with no applied field, $n(E)$ is the index of refraction as a function of applied field, $r_{33}$ is the electro-optic, or Pockels', coefficient, and E is the applied field in V/m. From both simple measurements and the theoretical plot of Δn versus Δλ determined using analytical methods, we can extract a linear relationship between the shift in wavelength to the change in cladding having a proportionality constant of 0.016.

$$\Delta\lambda = 40.69 \times \Delta n_{clad} \times 2 n_{clad} \quad \text{(Equation 11)}$$

From here we can easily calculate the EO activity factor, $r_{33}$, by measuring the shift in wavelength position with applied voltage and using equations 10 and 11.

Three EO active cladding systems were examined in this study. The first was a FTC-type chromophore, YL156, doped 25% in polymethylmethacrylate (FIG. 14) which has been shown to have excellent photostability. The second was a variant of the widely used CLD chromophore, YL124, doped 25% into an APC-based copolymer which has demonstrated good photostability and thermal stability over 85° C. The third system was YL124 doped 25% into a dendritic chromophore host, PSLD41 which has enhanced EO activity. These materials have been measured using the Teng-Mann technique at 1.3 μm to have $r_{33}$ values of 50, 120, and 285 pm/V, respectively. All three films have demonstrated good photostability at telecommunication wavelengths and thermal stability over 70° C.

Structure, Operation, and Fabrication of Hybrid Silicon-Organic Devices

Silicon ring resonator devices having 80 μm diameter and 400 nm waveguide width were fabricated from electronic grade silicon-on-insulator wafers with top silicon thickness of approximately 120 nm on 1.4 μm bottom oxide using a Leica EBPG 5000+ electron beam system at 100 kV. Prior to lithography, the samples were manually cleaved, cleaned in acetone and isopropanol, baked for 20 minutes at 180° C., coated with 2 percent HSQ resist from Dow Corning Corporation, spun for two minutes at 1000 rpm, and baked for an additional 20 minutes. The samples were exposed at 5 nm step size, at 3500 μC/cm2.

Figure 12:
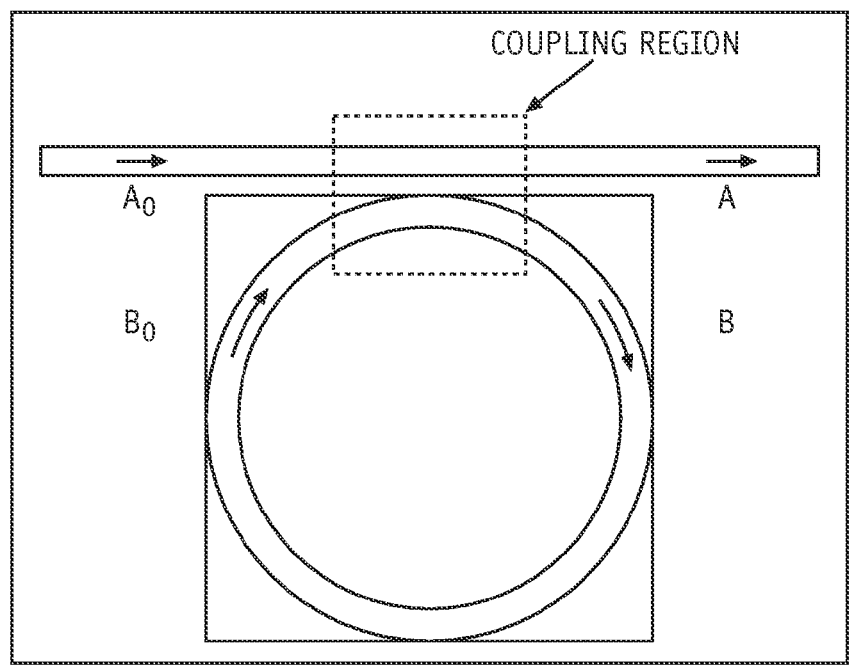
FIG. 12 illustrates coupling path of light from a channel waveguide into and out of a ring.

The samples were developed in AZ 300 TMAH developer for 3 minutes, and etched on an Oxford Instruments PLC Plasmalab 100 with chlorine at 80 sccm, forward power at 50 W, ICP power at 800 W, 12 mTorr pressure, and 33 seconds of etch time. The samples were then dipped in buffered hydrofluoric acid in order to remove the remnants of electron beam resist from the surface. The 1×4×1 ROADM consisted of four parallel cascaded ring resonator filters horizontally coupled to a common waveguide with 120 nm spacing (FIG. 12).

Figure 15:
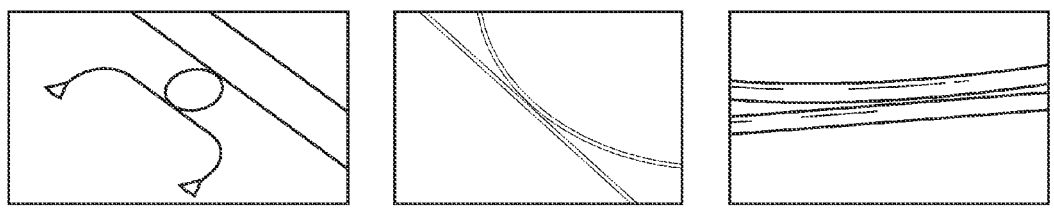
FIG. 15 illustrates an embodiment of a ring resonator.

The cross section of the hybrid ring resonator is shown in FIG. 15. Electrodes were patterned by depositing 10 nm of chromium and 100 nm of gold using e-beam evaporation followed by standard photolithography and wet etching of the metal electrode pattern. EO material was prepared as a 25 weight % mixture of YLD124 in (Poly[Bisphenol A carbonate-co-4,4'-(3,3,5-trimethylcyclohexylidene) diphenol carbonate]) dissolved with cyclopentanone to form a 12 solids weight % solution. After complete dissolution overnight, the solution was filtered through a 0.2 μm PTFE filter. Solutions of 25% YLD156 in PMMA and 25% YL124 in PSLD41 were prepared in an identical manner. One micron thick films of these materials were spun-cast onto the SOI devices substrates, baked for 1 minute at 110° C. and vacuum cured overnight at 85° C. To protect the EO layer from following fabrication steps, a 0.5 μm TEFLON® AF 601S2-1-6 film was spun-cast and cured. A 100 nm thick gold hard mask was sputtered on top of this film and vias were patterned using photolithography. The vias were etched through reactive ion etching using an $O_2$/He gas mixture. To contact through the via to the middle electrode, 500 nm of gold was sputtered and the top electrodes were patterned by photolithography. A second 0.5 micron TEFLON® layer was applied to the top of the device for protect the upper electrodes from delaminating and contact pads were cleaned using $O_2$/He plasma etching.

Figure 16:
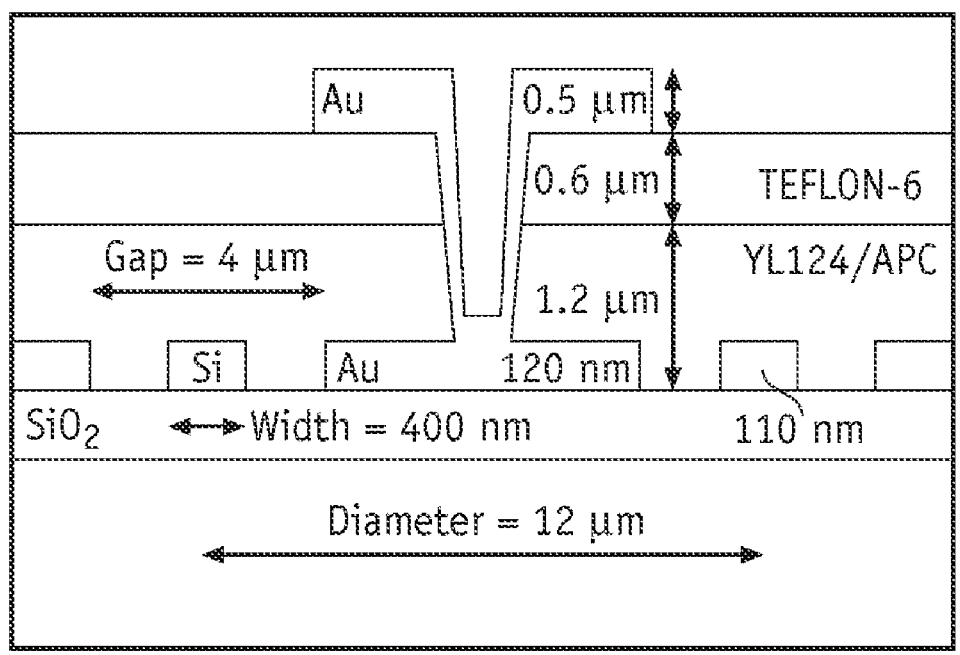
FIG. 16 illustrates the cross-section schematic of a single hybrid microring resonator device.

The device in FIG. 16 is poled and tuned by application of a voltage laterally across the EO polymer cladding between the inner and outer diameter of the Si microring resonator.

The maximum applied horizontal E field is simply estimated by the applied voltage divided by the electrode gap. The actual applied E fields at any given location, both horizontal and vertical, are lower, and can be estimated by simulation, assuming no flow of current.

However, since leakage currents are present during poling and device operation, estimates of position dependent E-fields are more complex, and may contribute to less than estimated tuning efficiencies measured for device operation. To minimize EO effects across the optical coupling region, the electrodes and applied E field did not span this region. The process for contact poling involved raising the temperature of the sample to just below its glass transition temperature (Tg≈146° C. for YL124/APC), applying a DC voltage to the inner and outer electrodes, and holding the sample at that temperature under a potential field for two minutes after which the sample was cooled back down to room temperature and the field was removed.

Device Parameters and Performance

Single Organic-silicon Hybrid Devices

Figure 17:
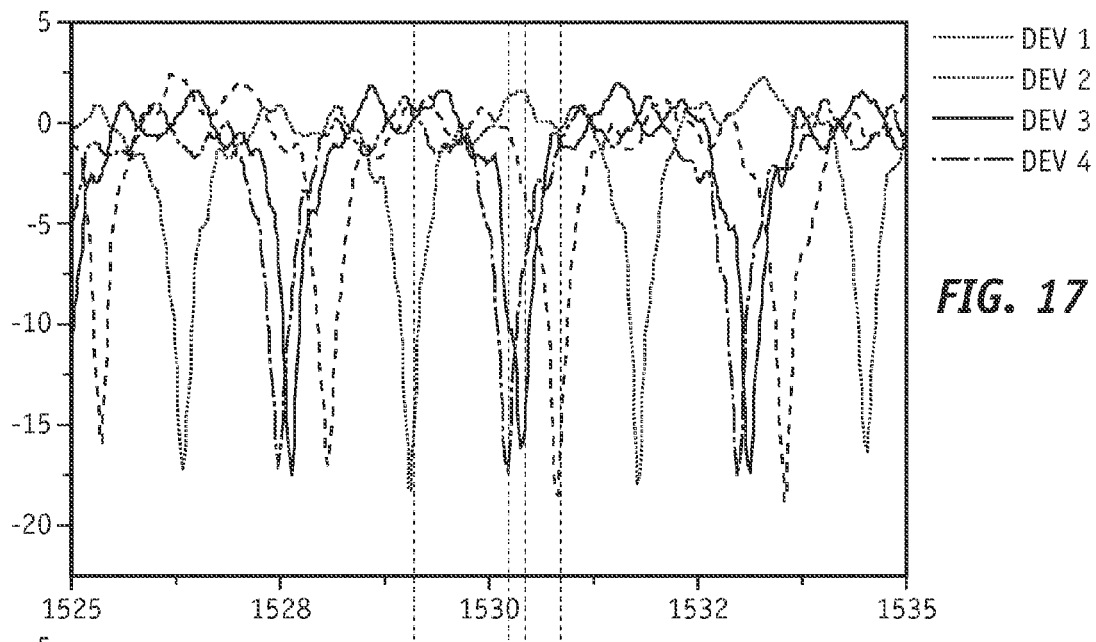
FIG. 17 illustrates overlaid resonance spectra viewed from single device output.
Figure 18:
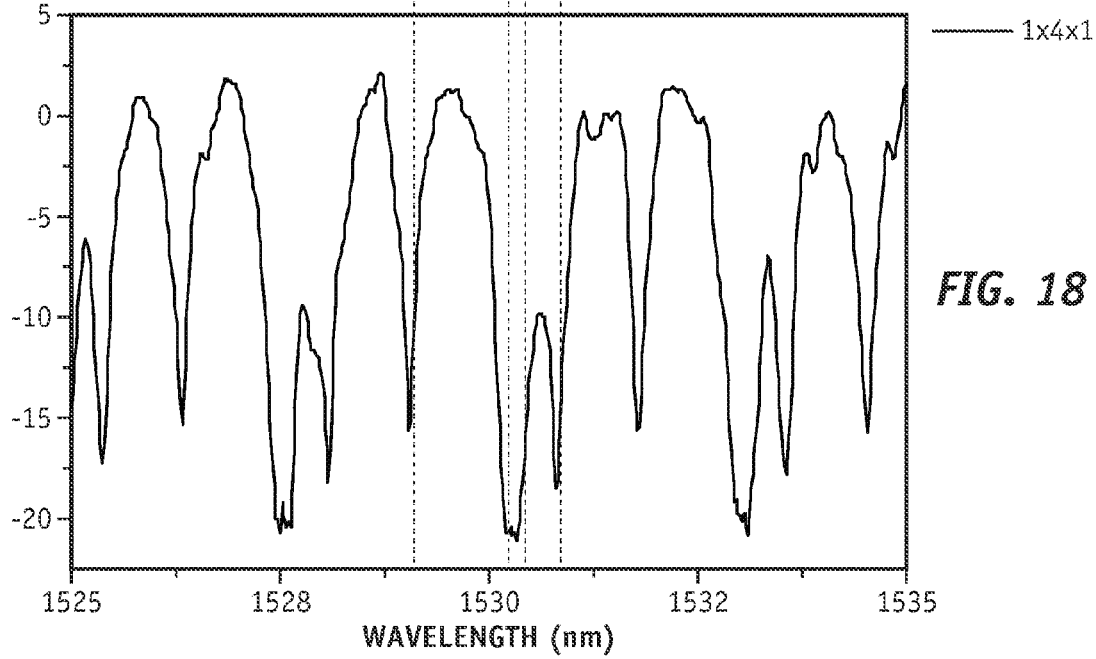
FIGS. 18 and 19 illustrates resonance spectrum of 1×4×1 ROADM device.
Figure 19:
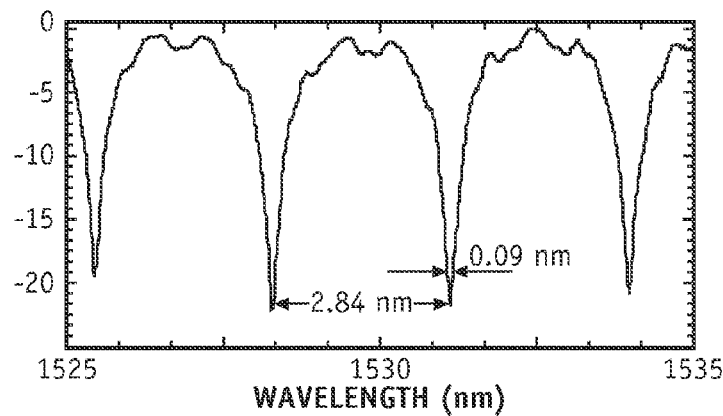

Samples were mounted onto an optical stage system and coupled out-of-plane to a single-mode optical fiber array using grating couplers. The light source was a Lightwave Technologies broadband amplified spontaneous emission (ASE) broadband laser centered at 1550 nm with 20 mW optical power. The output signal was analyzed using an ANDO AQ6316 Optical Spectrum Analyzer with 0.05 nm resolution. In FIG. 17, the spectral scans of each of the four microring resonator devices is overlayed and can be compared to the spectral scan of the 1×4×1 ROADM in FIG. 18.

The direct correlation of the resonance peaks of each filter with resonance peaks of the ROADM shows that the spectrum of the ROADM is indeed a linear combination of its constituent device spectra. The total optical loss for a diffraction grating coupled EO clad silicon microring resonator and the coupled 1×4×1 system is around −10 dB and −20 dB, respectively. As shown in the FSR for these EO clad devices is 2.74 nm and the 3-dB bandwidth for these devices is approximately 0.51 nm. A resonant wavelength of Device 1 (see the plot labeled DEV 1 in FIG. 17) at 1,529.06 nm shows a 17.5 dB drop in transmission.

These details imply Q values for these devices around 3,000 and finesse values above 5. Prior to poling, the resonance spectra of the sister rings of this ROADM were identical as expected given their identical diameters and cladding. After poling all four resonator devices simultaneously however, it was observed that the resonance spectra no longer matched in resonances differing by as much as 1 nm or $\Delta n_{eff}$=0.004. One possible explanation is that due to small differences in electrode alignment and spacing the material surrounding each resonator was poled with varying field strengths resulting in subtle differences in index big enough to give each device a distinct resonance spectrum.

To determine the magnitude of EO tuning (GHZ/V) DC voltage was applied to the device using a TREK 810B power supply/amplifier. By coupling to the input and output ports of device 5, the DC modulation of device 4 was monitored showing a clear shift to the left when −300 V was applied, a return to the original position when voltage was removed, and a clear shift to the right when 300V was applied. This 0.63 nm shift with 600V DC modulation at 1.55 µm is equivalent to 0.167 GHz/V tuning. The $r_{33}$ value of the EO material was then determined to be 22 pm/V using equations 10 and 11.

Although this value is lower than the expected $r_{33}$ value of 67 pm/V for YL124/APC measured at 1.55 µm with 67 V/µm poling field, it shows higher EO activity that those obtained from polymer microring resonators or Mach-Zehnder modulators made from CLD1/APC. Devices 1, 2 and 4 (see plots labeled DEV 1, DEV 2, and DEV 4 in FIG. 17) yielded similar EO activities ranging from 0.131 to 0.160 Ghz/V. When kept under vacuum over three months, this EO ROADM maintained over 80% of its original activity indicating good thermal and mechanical stability.

Figures 20, 21:
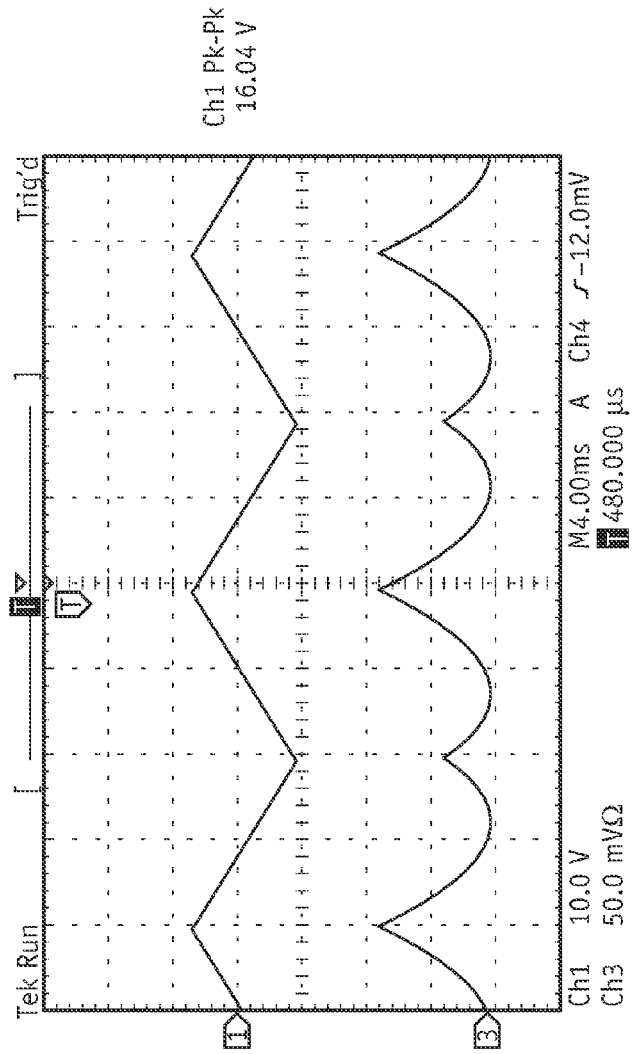
FIG. 20 is a table of predicted and measured electro-optic activity for various devices at 1550 nm.
FIG. 21 illustrates modulation of optical intensity with applied triangular AC voltage.

Electro-optic ROADMs fabricated using the system of YL124 chromophore doped into the dendritic chromophore PSLD41 showed more than a twofold increase in EO activity of 0.34 GHz/V and $r_{33}$ values of up to 41 pm/V (FIG. 20). At high modulation voltages (±300V DC), these devices exhibited up to 1.44 nm or 180 GHz tuning. The measured r33 values from these experiments studying three different organic EO systems showed good correlation to the expected $r_{33}$ values determined using the Teng-Mann technique. The lower than expected EO performance of the materials may be due to our choosing not to pole over the coupling regions of this device, which limits our modulation field by at least 30%.

AC modulation experiments were performed using a HP tunable laser source and a Laser Diode Inc detector/TIA module connected to a post amplifier for optical to electrical signal conversion. A Tektronix TDS 3034 Scope was used to display the signal waveform. An HP 3312A function generator was connected to the TREK 810B power supply/amplifier in amplifier mode to create the triangular waveform signal. Modulation of optical intensity with applied AC signal in these devices could be easily detected below 8 V with 3 MHz modulation frequency (FIG. 21). It is important to note here that the instrumentation available at the time of testing did not allow for device operation speeds greater than 3 MHz.

1×4×1 ROADM

To demonstrate the functionality of the 1×4×1 ROADM, the ring resonator filters should be capable of being modulated independently of each other. By coupling to the bus device while modulating only device 4, we can see that only one peak modulates significantly while the other peaks maintain the same position. Although the resonance of device 4 overlaps with another device spectrum, we can see a definite match in shifting behavior between and general match in peak position. In our studies, all four ring resonator filters could be modulated independently which demonstrates the complete functionality of our 1×4×1 ROADM device.

Our measured tuning shows that these devices would support tuning of at least four 50 GHz channels.

Conclusion

Although these resonance peaks did exhibit drift with prolonged optical power insertion and electric field modulation, the magnitude of drift could be significantly diminished, if not eliminated, by lowering optical power and strength of the modulating electric field, operating under an inert atmosphere, and by using chromophores with superior stability, such as YL156. The voltage needed to tune these devices could potentially be decreased by more than threefold by reducing the electrode gap from 5 µm to 1.5 µm using better photomask resolution or e-beam patterning. To further improve ROADM tuning characteristics, coupling two equal diameter rings in series would allow us to use the Vernier effect to increase FSR, multiplying the tuning shifts by a relationship to the ring diameter ratios.

Drive voltage can be cut in half by applying the push-pull poling technique used in Mach-Zehnder interferometers to these devices by poling the rings in opposite directions. Using higher quality-factor devices with Q values above 100 k would dramatically lower the VFWHM by five-fold for modulator applications.

Tuning Value Projections for Hybrid Wafer Scale EO on SOI Devices

The best SOI microring devices for modulators have shown to have a $\Delta\lambda_{FWHM}$ of less than 0.016 nm. This wavelength shift would imply an index change in cladding of 0.00025. If we use a material with 300 pm/V EO activity and 2 μm electrode spacing, a $\lambda_{FWHM}$ or −15 dB shift would require 0.63V. A device with these parameters would display 3.2 GHz/V tuning and have a drive voltage×length value of 0.016 VFWHM cm, a very small value compared to other EO modulator devices due to its small footprint. With this tuning parameter, only a several-fold enhancement would be required to tune over a 50 GHz DWDM channel spacing. This enhancement can readily be achieved with Vernier tuning approaches and/or reduced electrode gaps. The use of smaller diameter SOI rings to extend the FSR to (40 channels*50 GHz/channel) and multi-pole SOI microring filters to optimize the spectral efficiency will lead to rapidly EO tunable, DWDM compatible hybrid EO on SOI device systems.

In summary, we were successful in demonstrating the first hybrid inorganic-organic electro-optic ROADM device, strong EO tuning, and good thermal and photo-stability. It was also shown that there is still much room for improvement with regards to electric field optimization, stronger EO materials, and improved device quality. These results have thus demonstrated that hybrid silicon-polymer devices are highly likely to satisfy the needs of tomorrow's demanding telecommunications industry by meeting its high standards, contributing unique and beneficial characteristics, and through seamless integration with existent silicon-based technologies.

The following detailed description is merely illustrative in nature and is not intended to limit the embodiments of the present subject matter nor the application and uses of such embodiments. Furthermore, there is no intention to be bound by any expressed or implied theory presented in the preceding technical field, background, brief summary or the following detailed description.

Embodiments of the present subject matter may be described herein in terms of various semiconductor fabrication processing steps. For the sake of brevity, conventional techniques and components related to semiconductor device fabrication, ring resonators, waveguides, photolithography, and other aspects of the process may not be described in detail herein.

FIG. 1 is a flowchart illustrating an exemplary process 100 for manufacturing a silicon ridge optical ring resonator on a semiconductor wafer according to an embodiment, and FIGS. 2-9 depict a portion of a wafer 200 undergoing process 100. FIGS. 2-9 represent cross sectional views that generally correspond to the view from line A-A shown in FIG. 10. Process 100 performs a number of exemplary manufacturing steps such as masking, manipulation, chemical application of materials, deposition of materials, and etching to create the disclosed optical ring resonator. The various tasks of process 100 may be performed by suitably configured semiconductor manufacturing tools, equipment, and systems, which are known to those familiar with the semiconductor device industry. As used herein, the term exemplary is meant to describe an example and not an ideal.

Figure 2:
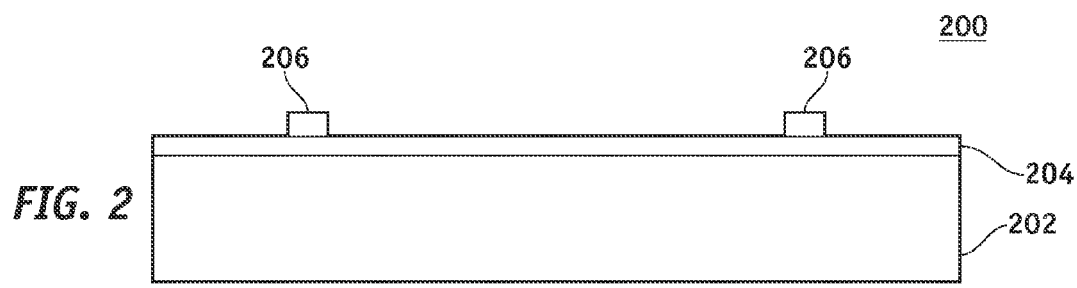
FIGS. 2-9 illustrate a schematic cross sectional view of a wafer undergoing a fabrication process for a silicon ridge waveguide ring resonator device.

Process 100 may begin by providing a semiconductor wafer, for example, a silicon-on-insulator (SOI) substrate wafer 200 (task 102). As depicted in FIG. 2, wafer 200 includes a substrate 202, which forms the starting point for microelectronic manufacturing. The substrate 202 is formed from a silicon or sapphire material, and is covered by an insulator layer 204 formed from an insulating material such as silicon dioxide, aluminum oxide, or the like which is topped by silicon layer 206.

Thereafter, a suitably shaped optical ring resonator is formed on the substrate 202 (task 104) using electron beam lithography and reactive ion etching. In addition, other optical waveguides, such as input/output waveguides, may be concurrently formed. FIG. 2 depicts an intermediate state in the fabrication process after formation of a ring waveguide 206 of an optical ring resonator, which in this embodiment is a silicon ridge waveguide. The ring shape of ring waveguide 206 is evident from the schematic top view of FIG. 10. Ring waveguide 206 is formed from a material having low optical loss especially at telecommunication wavelengths. The shape, line width, and thickness of ring waveguide 206 are selected according to the desired application. For this embodiment, waveguide line width is about 400 nm and line height is about 110 nm. The diameter of the ring resonator is about 80 μm and is horizontally coupled to the input and output waveguides with about 100-200 nm spacing. Ring waveguide 206 is formed above the insulator layer 204 using electron beam lithography and reactive ion etching procedures.

Process 100 then forms a conductive layer 208 (e.g., a metal layer such as a chrome and gold layer) on the wafer 200 using, for example, physical vapor deposition (task 106). Electron beam evaporation deposition is a common method of thin film deposition. The source material (e.g., gold and chrome) is evaporated in a vacuum. The vacuum allows vapor particles to travel directly to the exposed surface of the wafer 200, where they condense back into a solid state. For this embodiment, a thin layer of chrome (100 Angstroms) is deposited, followed by a thin layer of gold (1100 Angstroms). The purpose of the chrome layer is to increase adhesion between the gold and silicon surface and gold material was chosen due to its high conductivity and corrosion resistance.

Thereafter, electrode elements are formed (task 107) from conductive layer 208. In this regard, a layer of photoresist material is spin coated over the conductive layer 208. Spin coating is a technique for applying a uniform thin film of material to a wafer. An appropriate amount of a fluid (in this case the fluid is photoresist) is placed on wafer 200. The wafer 200 is then rotated at high speed in order to spread the fluid by centrifugal force. The fluid spins off the edge of wafer 200, and rotation is continued until the desired film thickness is achieved. The higher the rotational spinning speed, the thinner the film. Spin coating may be used to create thin films with thicknesses below about 10 nanometers. In order to deposit layers of photoresist about one micrometer thick, a wafer is typically spun at about 20 to 80 rotations per second for about 30 to 60 seconds.

Photoresist is a light-sensitive coating that is applied to a wafer, exposed, and developed prior to chemical etching. The exposed areas function as a mask for selective etching. In photolithography, a film of photoresist is used to temporarily hold the pattern of microscopic elements of a chip. When exposed to light, negative photoresists harden through photo-induced crosslinking and positive photoresists soften through photo-induced radical bond cleaving. An etching differential of the exposed versus unexposed areas to specially formulated alkaline or solvent solutions allows for the desired pattern to be generated. Positive photoresists were chosen to be used in this method because it allows for higher resolution.

Referring again to wafer 200, a photomask is used to pattern the photoresist on the wafer 200, the photoresist is developed, the superfluous gold and chrome on the wafer 200 is etched away, and the remaining photoresist is removed from the wafer 200. Etching is a process using a liquid ("wet") or plasma ("dry") chemical agent that removes the uppermost layer of the wafer 200 in areas that are not protected by photoresist. In wet etching, the wafer 200 can be immersed in a bath of etchant, which may be agitated to achieve good process control. Specialized etchants can be used to etch a specific type of surface. When applied to crystalline materials (e.g. silicon), etchants can be isotropic, which leads to large bias when etching thick films. The photographic developer used for photoresist is a type of wet etching. As an alternative to immersion, some machines employ a gas (e.g., nitrogen) to cushion and protect one side of the wafer 200 while etchant is applied to the other side. Metal layer etching was chosen over the lift-off metallization technique due to better resolution capabilities.

Figure 3:
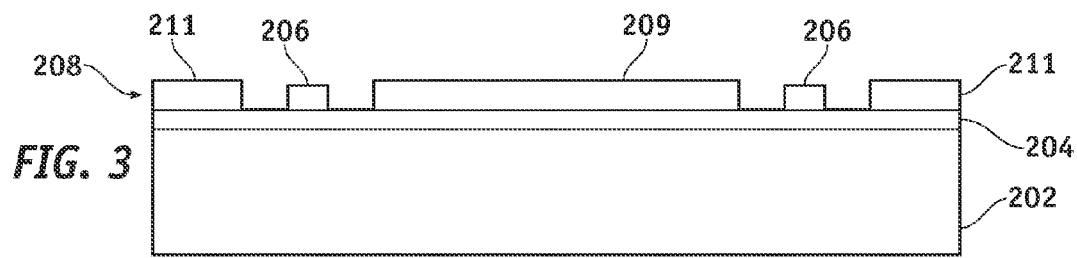
Figure 10:
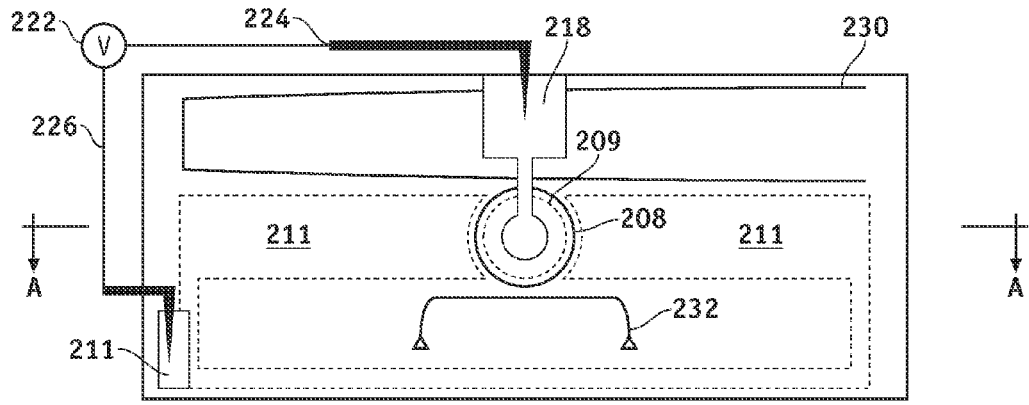
FIG. 10 is a schematic top view of an electrode interface to an optical ring resonator.

FIG. 3 illustrates wafer 200 after patterning and etching of the conductive layer 208. This results in the creation of a central electrode element 209 and an outer electrode element 211. These electrode elements are used to both align the material and control the wavelength selectivity of the resulting ring resonator device. The top view of FIG. 10 depicts one suitable layout of central electrode element 209 and outer electrode element 211. As shown in FIG. 10, central electrode element 209 is located inside ring waveguide 206, i.e., the ring waveguide 206 surrounds central electrode element 209. Moreover, outer electrode element 211 is positioned outside the perimeter of ring waveguide 206. In the illustrated embodiment, outer electrode element 211 is formed as a generally C-shaped trace such that its two opposing ends are located proximate ring waveguide 206. The electrode elements 209/211 are located at the same height as the ring resonator 206 in such a way as to define a gap between the central electrode element 209 and the inside ring waveguide 206, and another gap between the outer electrode element 211 and outside the perimeter of ring waveguide 206.

Figure 4:
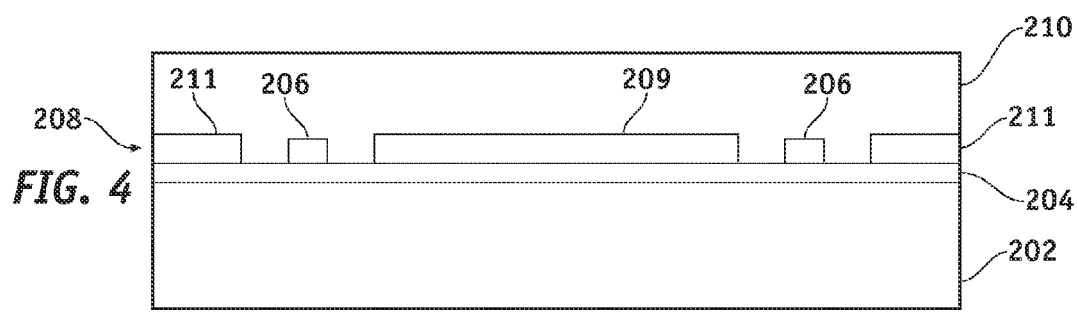

Process 100 then forms an electro-optic polymer cladding layer 210 by overlaying it on the wafer 200 (task 108). FIG. 4 illustrates wafer 200 after electro-optic polymer cladding layer 210 has been formed as an overlay on the surface of the wafer, covering ring waveguide 206 and electrode elements 209/211. Cladding layer 210 can be formed by spin-coating a suitable electro-optic polymer solution over the wafer 200, baking the wafer 200, and curing the wafer 200. The electro-optic polymer solution is spin coated on the wafer 200, and for this embodiment, the wafer 200 is first spun at about 500 rpm for about 5 seconds, and then the wafer 200 is spun at about 2000 rpm for about 30 seconds. Then, the wafer 200 is baked (for this embodiment the wafer 200 is baked at 110 degrees Celsius for about 2 minutes). The wafer 200 is then cured in a vacuum oven (for this embodiment the wafer 200 is cured under vacuum at 65 to 85 degrees Celsius for about 10 hours).

In certain embodiments, cladding layer 210 is formed from an electro-optic polymer solution containing electro-optic chromophores, molecules a conjugated backbone and large dipole moment, dispersed into host polymers, long chain or dendritic organic molecules, dissolved in a common solvent (e.g. cyclopentanone). This material exhibits non-linear changes in optical properties when exposed to an electrical field. The optic polymers employed here are transparent to most telecommunication wavelengths.

Examples of suitable optic polymers are polymethyl methacrylate (PMMA), perfluorinated polymers such as polytetrafluoroethylene, and those disclosed in the article titled "Optical Modulation and Detection in Slotted Silicon Waveguides," Optics Express 11 Jul. 2005, Vol. 13, No. 14, the content of which is incorporated herein by reference. For this embodiment, the electro-optic polymer solution comprises YL124 in a matrix of (Poly[Bisphenol A carbonate-co-4,4'-(3,3,5-trimethylcyclohexylidene) diphenol carbonate]), where the YL124 comprises about 25 percent of the electro-optic polymer. The electro-optic polymer solution comprises about 12 percent electro-optic polymer in cyclopentanone fluid. Devices using a second material of YL124 chromophore similarly dispersed in an electro-optic active dendrimer host, PSLD41 using trichloroethane were also fabricated. YL124 is synthesized in "Optical Modulation and Detection in Slotted Silicon Waveguides," Optics Express 11 Jul. 2005, Vol. 13, No. 14, the content of which is incorporated by reference here in its entirety. PSLD41 is synthesized in P. A. Sullivan, et al., "Tri-component Diels-Alder Polymerized Dendrimer Glass Exhibiting Large, Thermally Stable, Electro-optic Activity," Journal of Materials Chemistry, (2007), the content of which is incorporated by reference here in its entirety. After application, the cyclopentanone is evaporated by the above stated baking and curing steps, and the electro-optic polymer cladding layer 210 is formed.

As shown in FIG. 4, cladding layer 210 fills in the gaps between ring waveguide 206 and central electrode element 209, and the gaps between ring waveguide 206 and outer electrode element 211. Moreover, cladding layer 210 preferably extends above the upper surfaces of ring waveguide 206, central electrode element 209, and outer electrode element 211 by at least 1 μm to reduce optical loss. The electrode elements are eventually used to create a voltage differential across the cladding material located within the gaps and near ring waveguide 206. This voltage differential alters the refractive index of the cladding material near ring waveguide 206, which in turn controls the wavelength selectivity of the ring resonator device.

Figure 5:
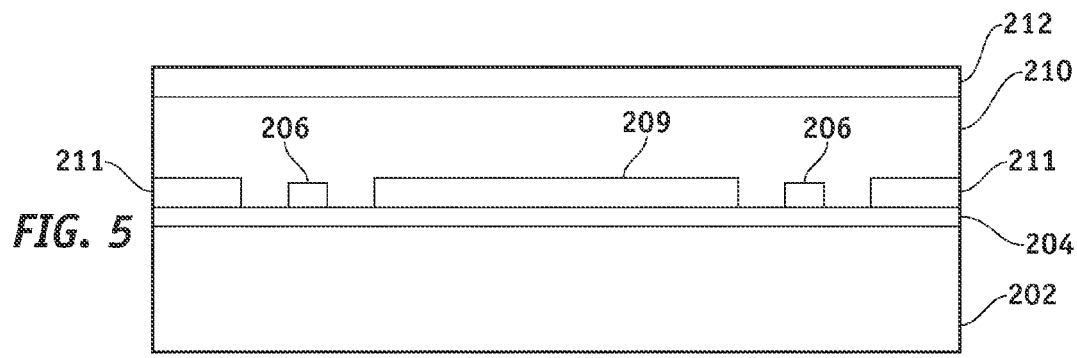

Process 100 then forms a second insulating layer 212 over the cladding layer 210 on the wafer 200 (task 110). In this embodiment, protective layer 212 is formed from a fluropolymer such as polytetrafluoroethylene (PTFE), which is commonly known as TEFLON® material. FIG. 5 illustrates the wafer 200 after protective layer 212 has been formed over the top surface of cladding layer 210. The protective layer 212 has dielectric isolation properties. Protective layer 212 is used to increase cladding thickness to reduce optical loss and electrically insulate electrodes from each other. In certain embodiments, the PTFE material is deposited on the wafer 200, and air cured for about five minutes. Then, the wafer 200 is baked at 110 degrees Celsius for about ten minutes and 135 degrees Celsius for about fifteen minutes. Thereafter, wafer 200 is cured in a vacuum oven at about 85 degrees Celsius for about 10 hours.

Figure 6:
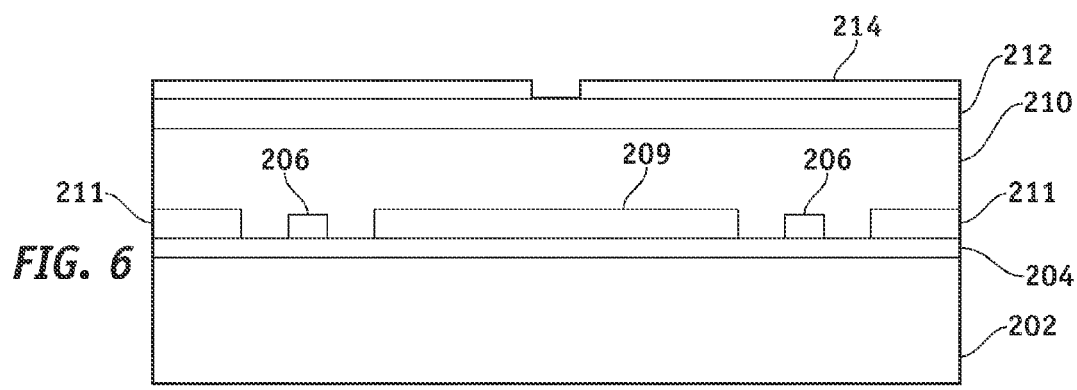

Next, a hard mask is formed over protective layer 212 (task 112). This hard mask is preferably formed from a metal such as gold. In practice, the gold is deposited using a sputtering procedure. Sputtering is a vapor deposition process whereby in a solid target material is bombarded by plasma ions (e.g., argon) causing atoms to be ejected in a gas phase. Sputtered atoms ejected in a gas phase into a vacuum chamber deposit a thin film on all surfaces in the vacuum chamber. A wafer 200 placed in the chamber will be coated with a thin film. Thereafter, a hard mask 214 is patterned using photolithography and wet chemical etching techniques. FIG. 6 illustrates the wafer 200 after formation of hard mask 214. The gold hard mask 214 is utilized to protect lower layers from the effects of heavy dry etching during via formation.

Figure 7:
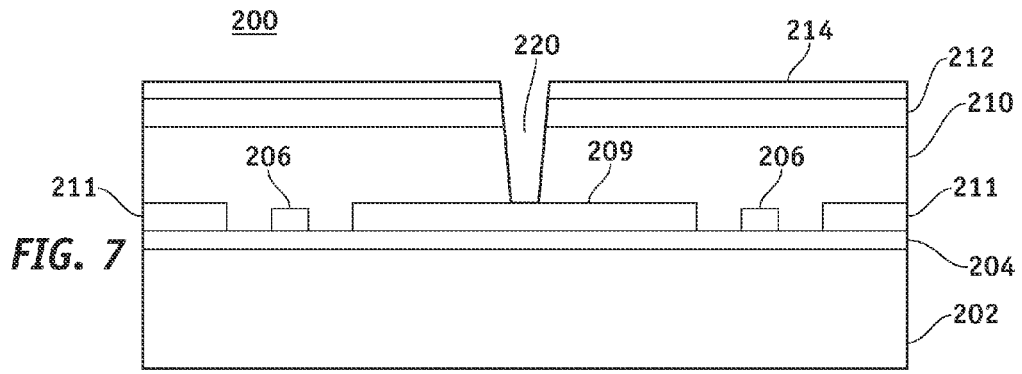

Process 100 then forms at least one via hole 220 in protective layer 212 and in electro-optic polymer cladding layer 210 (task 114). For this embodiment, via hole 220 is formed using plasma etching with oxygen gas, where the hard mask 214 serves as an etching mask to protect the remaining areas of wafer 200. FIG. 7 illustrates wafer 200 after via hole 220 has been formed. Although only one via hole 220 is depicted in FIG. 7, any number of via holes may be formed. Notably, via hole 220 extends to and terminates at the portion of central electrode element 209 that is located in the center of ring waveguide 206. Although not separately shown, one or more via holes for outer electrode element 211 may also be formed.

Figure 8:
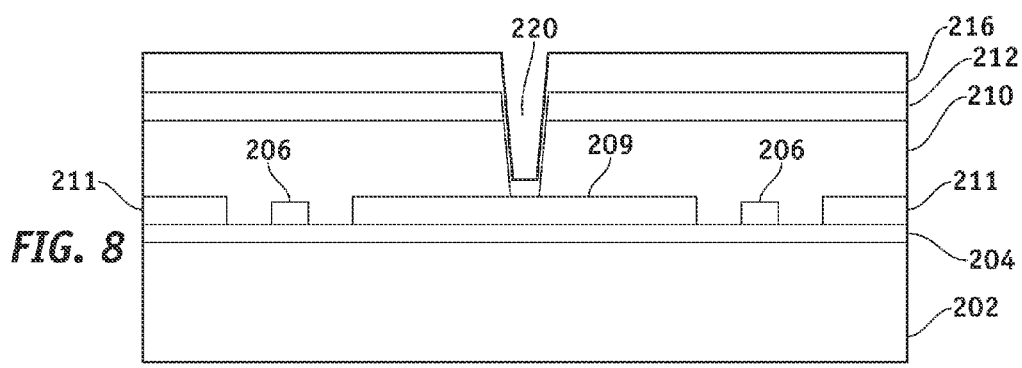
Figure 9:
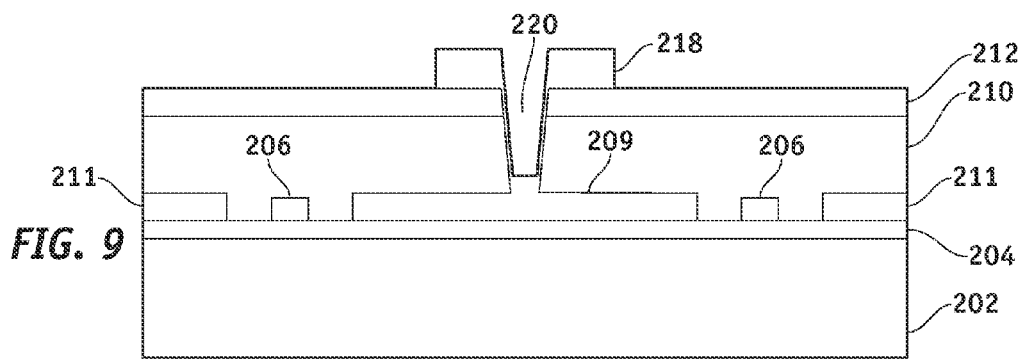

Process 100 then deposits electrode material to form a top conductive layer 216 on the wafer 200, resulting in the device structure shown in FIG. 8. The top conductive layer 216 is formed from a conductive electrode material, preferably a metal such as gold. In this embodiment, the top conductive layer 216 is formed by sputtering 500 nanometers of gold over hard mask 214. When the top conductive layer 216 is sputtered onto the hard mask 214, the hard mask 214 grows into top conductive layer 216. As shown in FIG. 8, the sputtered gold also extends down along the sidewalls of via hole 220, and it fuses with the previously exposed surface of central electrode element 209, which resides in the center of ring waveguide 206. Notably, central electrode element 209 is electrically isolated from the outer electrode element 211. The top conductive layer 216 is then further patterned to isolate electrodes of different devices forming a contact runout from the ring's center electrode feature 218 for the device, which is used to control the wavelength selectivity of the resulting ring resonator device (task 116). For this embodiment, the ring center electrode runout feature 218 is formed from the top conductive layer 216 using photolithography and wet chemical etching techniques. FIG. 9 illustrates the wafer 200 after formation of ring center electrode runout feature 218. As shown in FIG. 9, most of the top conductive layer 216 has been removed from the flat surface protective layer 212.

Again, the portions of conductive layer 208 that are not in the center of ring waveguide 206 form the outer electrode element 211 outside the perimeter of ring waveguide 206. The technique described above for central electrode 218 may also be used to create an outer electrode for outer electrode element 211. Ultimately, the central electrode 218 and the outer electrode are connected in an electrical circuit as shown in FIG. 10.

To activate the device, the ring center electrode feature 218 and conductive layer 208 are coupled to electrical connections 224 and 226 respectively, which are the electrical connections for a control voltage from a voltage source 222 (see FIG. 10). The device electrodes are coupled to the electro-optic polymer cladding layer 210 on opposite sides of the ring waveguide 206 as shown in FIG. 9 and FIG. 10. Under nitrogen flow to prevent oxygen radical formation, a small field of about 100 V or 20V/μm is applied across the electrodes. The sample is then heated at a rate of 10 degrees Celsius per minute to a target temperature about five degrees Celsius below the material's glass transition temperature. The voltage is then increased to 300 V or 60V/μm and held at the target temperature for two minutes and the sample is cooled at about 10 degrees Celsius/min to room temperature after which the applied voltage is removed.

Process 100 may then polarize the EO materials (task 117) and prepare the device for testing (task 118). Testing is generally done to classify performance and to verify the function of the fabricated device. Optical testing of devices was performed by vertically coupling light from a broadband source centered at 1550 nm into and out of the device via diffraction grating coupling method. This method was chosen over end fire coupling because it does not require cleaving of the substrate and introduces minimal insertion loss. An optical scan of a typical activated hybrid electro-optic ring resonator is presented in FIG. 18 where FSR, Q and $\lambda_{FWHM}$ are 2.8 nm, 17,000, and 0.09 nm respectively at 1530 nm. It is important to note here that Q values are relatively low for silicon ring resonators due to the intentional quenching of coupling efficiency to increase reproducibility and allow for square wave applications. To test electro-optic activity, the electrode features formed in wafer 200 can be probed to verify the operation of the device. The ring center electrode feature 218 and conductive layer 208 are coupled to electrical connections 224 and 226 respectively, which are the electrical connections for a control voltage from a voltage source 222 (see FIG. 10). The device electrodes are coupled to the electro-optic polymer cladding layer 210 on opposite sides of the ring waveguide 206 as shown in FIG. 9 and FIG. 10. The electrodes provide a voltage and current across the ring waveguide 206 for controlling the properties of the electro-optic polymer cladding layer 210.

In normal operation, optical signals may be input through either input/output waveguide 230 or 232 (see FIG. 10). The input signal is coupled to the ring waveguide 206, and in normal operation, the input signal will be selectively transferred by the ring waveguide 206 from the input waveguide to the output waveguide. The input/output waveguides 230 and 232 are fabricated on the same substrate 202 as ring waveguide 206.

Figures 23, 24:
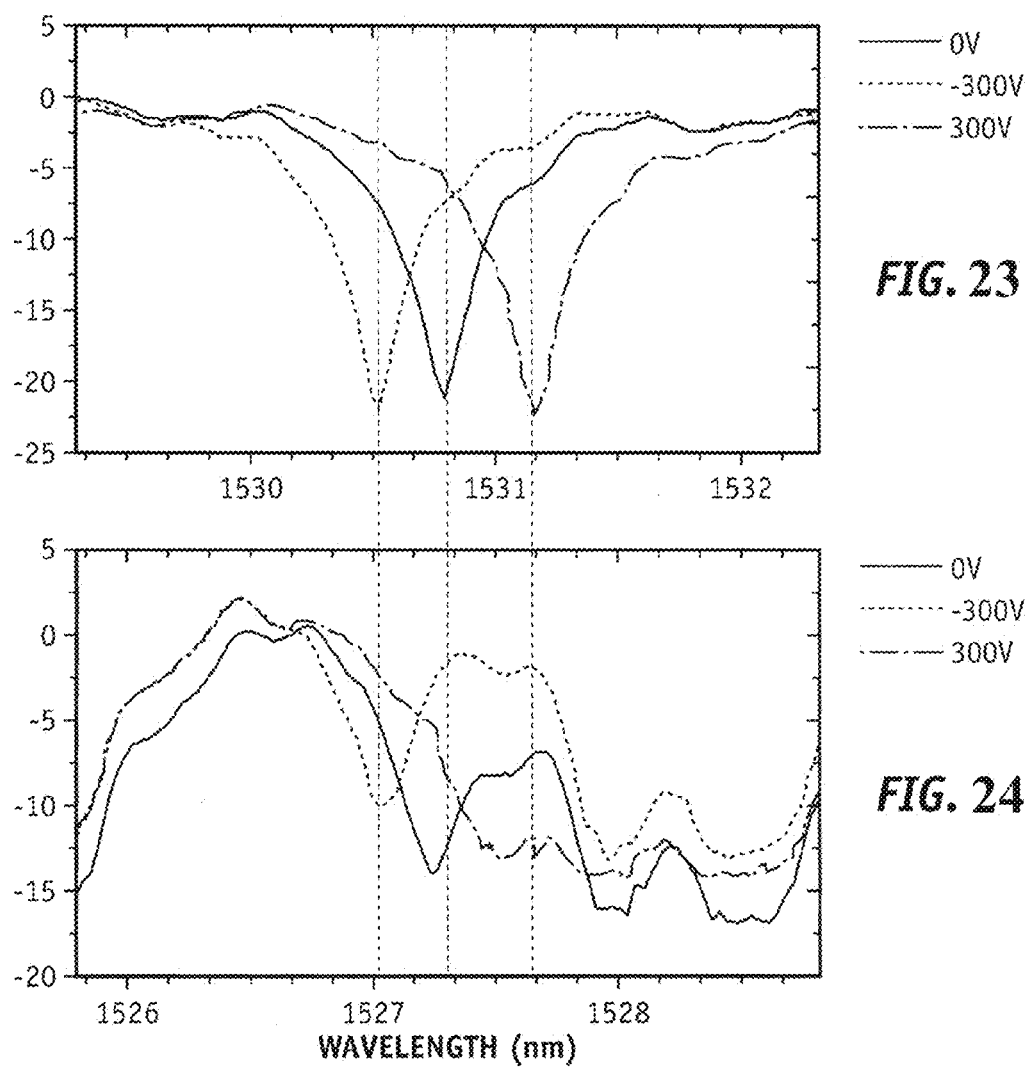
FIG. 23 illustrates a resonance modulation viewed from single device output.
FIG. 24 illustrates a resonance modulation of single device viewed from 1×4×1 device output.

The voltage source 222 is configured to control the characteristics of ring waveguide 206 by applying the desired control voltages to electro-optic polymer cladding layer 210 through the electrode features. The operation of the ring waveguide 206 can be verified using voltage source 222 by analyzing optical signals input and output using input/output waveguides 230 and 232. Optical spectra of the device were taken at under various DC fields beginning with the ground state of 0V followed by −5V, +5V, −10V, +10V, −50V, +50V, −100V, +100V, −200V, +200V, and −300V, +300V. Overlaid optical spectra of a typical electro-optic ring resonator taken at 0V, 300V, −300V and 0V in that order are presented in FIG. 23. By tracking the resonance peaks, an electro-optic tuning factor of about 0.17 GHz/V was assessed in this device and up to about 0.34 GHz/V in our best performing devices. When monitoring electro-optic activity with AC field application, a tunable laser first tuned to the peak position after which it is modulated with an applied AC field. A Tektronix TDS 3034 Scope was used to display the signal waveform. An HP 3312A function generator was connected to the TREK 810B power supply/amplifier in amplifier mode to create the triangular waveform signal as shown in FIG. 23. The voltage source 222 may include any number of distinct processing modules or components that are configured to perform the tasks, processes, and operations described in more detail herein. In practice, the voltage source 222 may be implemented or performed with a general purpose processor, a content addressable memory, a digital signal processor, an application specific integrated circuit, a field programmable gate array, any suitable programmable logic device, discrete gate or transistor logic, discrete hardware components, or any combination thereof, designed to perform the functions described herein. A voltage source 222 may be realized as a microprocessor, a processing logic element, a microcontroller, or a state machine. A probe may also be implemented as a combination of computing devices, e.g., a combination of a digital signal processor and a microprocessor, a plurality of microprocessors, one or more microprocessors in conjunction with a digital signal processor core, or any other such configuration.

Because the ring resonators described herein utilize low index electro-optic polymers claddings coupled to high index silicon, as opposed to all polymer devices, the large index contrast allows ring resonators to be made much smaller than current electro-optic polymer ring resonator designs. For example, due to the low index contrast, a ring resonator made using only electro-optic polymers may be must have a diameter of at least 400 µm to minimize bending loss, while a silicon ring resonators can be made as small as 5 µm in diameter. Compared to inorganic electro-optic materials such as doped silicon or Lithium niobate, the use of electro-optic polymers enable faster wavelength selectivity performance relative to conventional ring resonators. For instance, ring resonators that use electro-optic polymers have reconfiguration times in the picosecond range (in contrast to existing solutions, which have reconfiguration times in the millisecond range).

While at least one example embodiment has been presented in the foregoing detailed description, it should be appreciated that a vast number of variations exist. It should also be appreciated that the example embodiment or embodiments described herein are not intended to limit the scope, applicability, or configuration of subject matter in any way. Rather, the foregoing detailed description will provide those skilled in the art with a convenient road map for implementing the described embodiment or embodiments. It should be understood that various changes can be made in the function and arrangement of elements without departing from the scope defined by the claims, which includes known equivalents and foreseeable equivalents at the time of filing this patent application.

What is claimed is:

1. A method for manufacturing an optical ring resonator device, the method comprising:
    forming a ring resonator waveguide on a semiconductor substrate;
    forming an unoriented electro-optic polymer cladding over the ring resonator waveguide
    forming electrodes on the semiconductor substrate or manipulation of the electro-optic polymer cladding; and
    poling the cladding by applying a voltage laterally across the cladding between the inner and outer diameter of the waveguide without entirely spanning a coupling region of the waveguide.

2. The method according to claim 1, wherein forming the ring resonator waveguide comprises forming a ridge waveguide.

3. The method according to claim 1, wherein the semiconductor substrate comprises a silicon-on-insulator substrate.

4. The method according to claim 1, further comprising forming at least one conductive via to establish electrical contact with at least one of the electrodes.

5. The method of claim 1, wherein forming the electrodes includes
    forming a central electrode element on the semiconductor substrate, the central electrode element being surrounded by the ring waveguide; and
    forming an outer electrode element on the semiconductor substrate, the outer electrode element being located outside a perimeter of the ring waveguide;
    wherein the cladding layer is formed over the ring waveguide, over the central electrode element, and over the outer electrode element.

6. The method according to claim 5, wherein forming an electro-optic polymer cladding layer comprises forming the electro-optic polymer cladding layer from a material having a variable index of refraction that changes in response to an applied voltage, the changed index of refraction being operable to change resonant wavelength characteristics of the optical ring resonator device.

7. The method according to claim 5, wherein forming an electro-optic polymer cladding layer comprises forming the electro-optic polymer cladding layer from a material having a variable polymer orientation that changes in response to an applied voltage.

8. A method for manufacturing an optical ring resonator device, the method comprising:
    providing a wafer comprising a semiconductor substrate;
    forming an insulating layer on the semiconductor substrate;
    forming a ring resonator waveguide over the insulating layer;
    forming, from a conductive layer, a central electrode element and an outer electrode element, the ring resonator waveguide surrounding the central electrode element, and the outer electrode element being located outside a perimeter of the ring resonator waveguide;
    covering the ring resonator waveguide, the central electrode element, and the outer electrode element with an unoriented electro-optic polymer layer, the unoriented electro-optic polymer layer being configured to change orientation under an applied electric field;
    forming a protective layer over the electro-optic polymer layer, wherein the protective layer has dielectric isolation properties;
    forming a hard mask over the protective layer;
    forming a via hole in the protective layer and in the electro-optic polymer layer, the via hole being defined by the hard mask, and the via hole terminating at the central electrode element; and
    depositing electrode material in the via hole, the electrode material establishing electrical contact with the central electrode element.

9. The method according to claim 8, wherein forming the central electrode element and the outer electrode element comprises forming the conductive layer from chrome and gold.

10. The method according to claim 8, wherein covering the waveguide includes:
    spin coating the wafer with an electro-optic polymer solution to obtain a spin coated wafer;
    baking the spin coated wafer to obtain a baked wafer; and
    curing the baked wafer in an oven.

11. The method according to claim 10, wherein the electro-optic polymer solution comprises about 12 percent of an electro-optic polymer and about 88 percent of cyclopentanone fluid.

12. The method according to claim 8, wherein forming the protective layer includes coating the electro-optic polymer layer with a polytetrafluoroethylene (PTFE) layer.

13. The method according to claim 8, wherein depositing electrode material further comprises depositing the electrode material over the protective layer.

14. The method according to claim 8, further comprising:
    forming a second via hole in the protective layer and in the electro-optic polymer layer, the second via hole being defined by the hard mask, and the second via hole terminating at the outer electrode element; and
    depositing electrode material in the second via hole such that it establishes electrical contact with the outer electrode element.

15. The method according to claim 8, wherein depositing the electrode material in the second via hole further comprises depositing the electrode material over the protective layer.

16. The method according to claim 8, further comprising:
coupling the central electrode element and the outer electrode element to an electrical voltage source,
applying a nitrogen flow to the wafer to prevent oxygen radical formation;
applying a voltage of about 20V/μm across the central electrode element and the outer electrode element;
heating the wafer at a rate of about 10 degrees Celsius per minute to a target temperature about 5 degrees Celsius below a glass transition temperature of the wafer;
increasing the voltage to about 60V/μm;
holding the target temperature for about two minutes;
cooling the wafer at about 10 degrees Celsius/min to room temperature;
removing the applied voltage.

17. The method according to claim 8, further comprising optically testing the optical ring resonator device, wherein the optical testing comprises diffraction grating coupling the optical ring resonator device to a broadband light, the broadband light having a wavelength centered at about 1550 nm.

18. The method according to claim 8, further comprising electro-optic activity testing the optical ring resonator device, wherein the electro-optic activity testing comprises:
coupling the central electrode element and the outer electrode element to a control voltage from a voltage source; and
verifying operation of the optical ring resonator device.

19. A method for manufacturing an optical ring resonator device, the method comprising:
forming a ring resonator including a ring waveguide, a central electrode surrounded by the waveguide, and an outer electrode surrounding the ring waveguide;
covering the ring resonator waveguide, the central electrode element, and the outer electrode element with an unoriented electro-optic polymer layer;
forming a protective layer having processing and dielectric isolation properties over the electro-optic polymer layer; and
forming an electrode on the protective layer.

20. The method of claim 19, wherein the protective layer is made of a fluropolymer.

21. The method of claim 19, further comprising poling the electro-optic polymer layer.

22. The method of claim 21, wherein the poling includes applying a voltage laterally across the electro-optic polymer layer between the inner and outer diameter of the waveguide without entirely spanning a coupling region of the waveguide.

23. The method of claim 19, wherein the electrode on the protective layer includes a central electrode runout feature.

* * * * *